(12) United States Patent
Lee

(10) Patent No.: US 8,500,160 B2
(45) Date of Patent: Aug. 6, 2013

(54) KNEE AIRBAG APPARATUS

(75) Inventor: Jung Su Lee, Gyeonggi-do (KR)

(73) Assignee: Hyundai Mobis Co., Ltd, Yongin-si, Gyeonggi-do (KR)

( * ) Notice: Subject to any disclaimer, the term of this patent is extended or adjusted under 35 U.S.C. 154(b) by 347 days.

(21) Appl. No.: 12/911,270

(22) Filed: Oct. 25, 2010

(65) Prior Publication Data

US 2012/0007345 A1 Jan. 12, 2012

(30) Foreign Application Priority Data

Jul. 9, 2010 (KR) .................. 10-2010-0066333

(51) Int. Cl.
*B60R 21/16* (2006.01)

(52) U.S. Cl.
USPC .............. 280/730.1; 280/728.1; 280/743.1; 280/743.2

(58) Field of Classification Search
USPC ............ 280/730.1, 743.1, 743.2, 728.1
See application file for complete search history.

(56) References Cited

U.S. PATENT DOCUMENTS

| 7,766,374 B2 * | 8/2010 | Abele et al. | 280/730.1 |
| 8,096,578 B2 * | 1/2012 | Wigger et al. | 280/732 |
| 8,118,325 B2 * | 2/2012 | Enders et al. | 280/730.1 |

FOREIGN PATENT DOCUMENTS

| JP | 2003-306116 | | 10/2003 |
| JP | 2004-210092 | A | 7/2004 |
| JP | 2004-314763 | A | 11/2004 |
| JP | 2008-296785 | | 12/2008 |

* cited by examiner

*Primary Examiner* — Eric Culbreth
(74) *Attorney, Agent, or Firm* — Sherr & Jiang, PLLC

(57) ABSTRACT

Provided is a knee airbag apparatus including an airbag cushion that develops upward without sagging downward to protect the passenger's knee.

21 Claims, 4 Drawing Sheets

(a)

(b)

KNEE AIRBAG APPARATUS

CROSS-REFERENCE TO RELATED APPLICATIONS

The present application claims priority to Korean Patent Application Number 10-2010-0066333 filed Jul. 9, 2010, the entire contents of which application is incorporated herein for all purposes by this reference.

BACKGROUND OF THE INVENTION

1. Field of the Invention

The present invention relates to a knee airbag apparatus, and more particularly, to a knee airbag apparatus equipped with an airbag cushion that develops upward without sagging downward to be positioned between the instrumental panel and a passenger's knee.

2. Description of the Related Art

In general, A vehicle is equipped with airbag apparatuses, safety devices, which protect passengers with an airbag cushion inflated by inflow gas in an accident.

Those airbag apparatuses are installed at desired positions in the vehicle and there have been proposed a driver airbag apparatus mounted in a steering wheel to protect a driver in a driver seat, a passenger airbag apparatus mounted at the upper portion in a glove box to protect a passenger in a passenger seat, a curtain airbag apparatus mounted on a roof rail to protect a passenger's side, and a knee airbag apparatus mounted in a instrument panel to protect a passenger's knee.

In these apparatuses, according to the knee airbag apparatus, an airbag housing accommodating an inflator, which is a device generating gas, and an airbag cushion is disposed at the lower portion in the instrument panel and an inflator, such that the airbag cushion protects the passenger's knee by being inflated and developed by inflow gas from the inflator in a car accident.

However, since the knee airbag apparatus is disposed at the lower portion in the instrument panel, lower than the passenger's knee, the airbag cushion should inflate upward without sagging downward to be positioned between the instrument panel and the passenger's knee in order to protect the passenger's knee.

SUMMARY OF THE INVENTION

The present invention has been made in effort to provides a knee airbag apparatus equipped with an airbag cushion that inflates upward without sagging downward to be positioned between the instrument panel and the passenger's knee.

The objects of the present invention are not limited to the object described above, and the other objects not stated in the above will be clearly understood by those skilled in the art from the following description.

An exemplary embodiment of the present invention provides a knee airbag apparatus includes: an instrument panel; an airbag housing disposed at the lower portion in the instrument panel; and a cushion pocket disposed in the airbag housing, accommodating an airbag cushion, and supporting the airbag cushion such that the airbag cushion develops upward outside the instrument panel without sagging to be positioned between the instrument panel and a passenger's knee.

Another exemplary embodiment of the present invention provides a knee airbag apparatus includes: an instrument panel; an airbag housing disposed at the lower portion in the instrument panel; an airbag cushion disposed in the airbag housing, having a fold portion folded such that the upper portion is shorter than the lower portion, and bending upward from the fold portion and developing upward outside the instrument panel to be positioned between the instrument panel and a passenger's knee, when a gas flows therein.

Yet another exemplary embodiment of the present invention provides a knee airbag apparatus includes: an instrument panel; an airbag housing disposed at the lower portion in the instrument panel; an airbag cushion disposed in the airbag housing, having a fold portion folded such that the upper portion is shorter than the lower portion, and bending upward from the fold portion and developing upward outside the instrument panel to be positioned between the instrument panel and a passenger's knee, when a gas flows therein; and a cushion pocket disposed in the airbag housing, accommodating the airbag cushion, and supporting the airbag cushion such that the airbag cushion develops upward outside the instrument panel without sagging to be positioned between the instrument panel and the passenger's knee.

The details of other exemplary embodiments are included in the detailed description and the drawings.

According to the exemplary embodiments of the present invention, since the cushion pocket accommodating the airbag cushion is disposed to support the airbag cushion such that the airbag cushion can develop upward without sagging downward, the airbag cushion develops between the instrument panel and the passenger's knee. Accordingly, the present invention has an effect that the airbag cushion can develop to a position where the passenger's knee can be protected.

Further, since the fold portion is formed such that the upper portion is shorter than the lower portion of the airbag cushion, tension is larger at the upper portion than the lower portion when the airbag cushion develops. Therefore, the airbag cushion bends and develops upward from the fold portion to be positioned between the instrument panel and the passenger's knee, such that the present invention has an effect that the airbag cushion can develop to a position where the passenger's knee can be protected.

The effects of the present invention are not limited to the effects described above, and the other effects not stated in the above will be clearly understood by those skilled in the art from the following description.

DETAILED DESCRIPTION OF THE EMBODIMENTS

Figure 1:
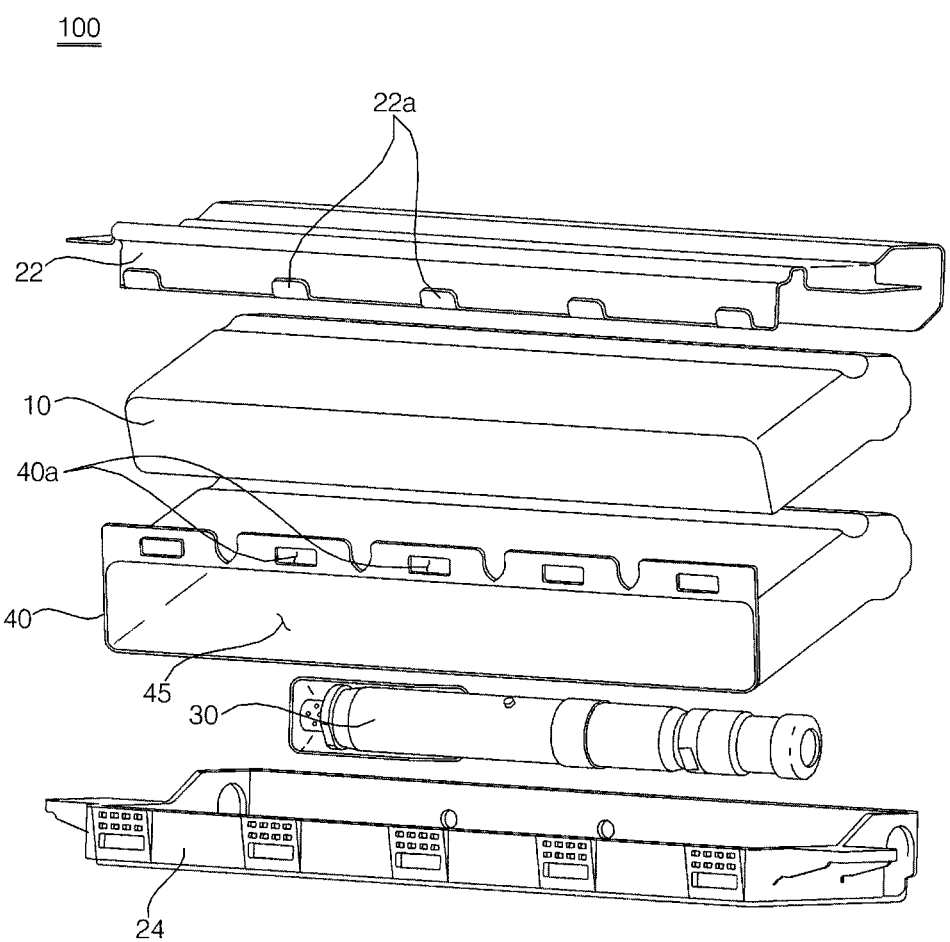
FIG. 1 is a view illustrating the configuration of a knee airbag apparatus according to an exemplary embodiment of the present invention.

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like components throughout the specification.

A knee airbag apparatus according to an exemplary embodiment of the present invention is described hereafter with reference to the accompanying drawings.

Figure 2:
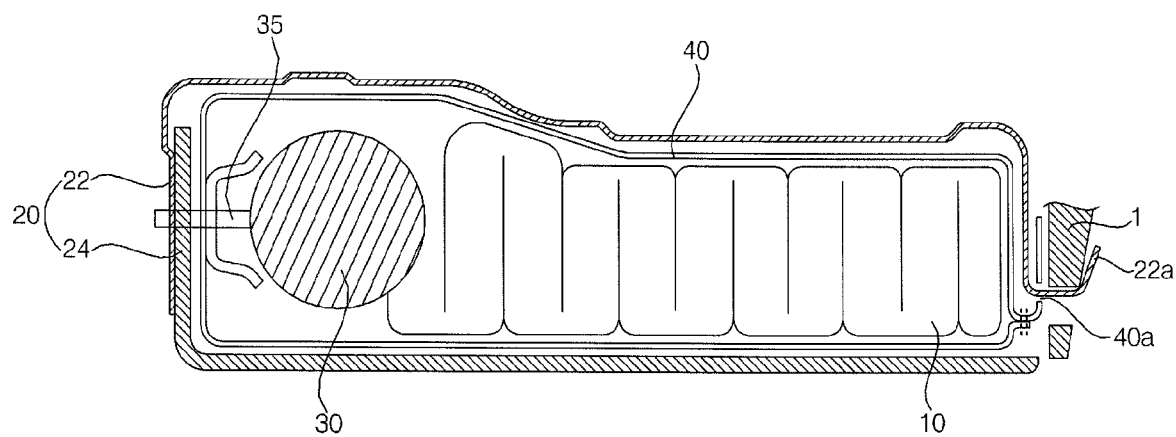
FIG. 2 is a cross-sectional view illustrating an assembly of the knee airbag apparatus according to an exemplary embodiment of the present invention.
Figure 3:
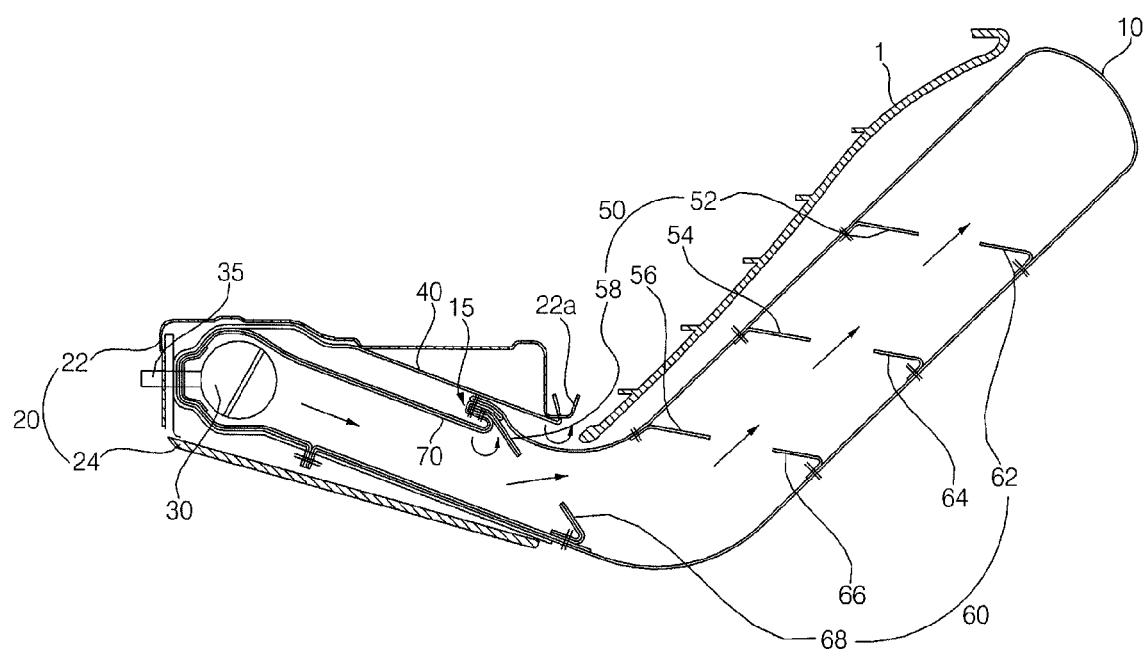
FIG. 3 is a view illustrating the operation of the knee airbag apparatus according to an exemplary embodiment of the present invention.

FIG. 1 is a view illustrating the configuration of a knee airbag apparatus 100 according to an exemplary embodiment of the present invention, FIG. 2 is a cross-sectional view illustrating an assembly of the knee airbag apparatus 100 according to an exemplary embodiment of the present invention, and FIG. 3 is a view illustrating the operation of the knee airbag apparatus 100 according to an exemplary embodiment of the present invention.

Referring to FIGS. 1 to 3, the knee airbag apparatus 100 according to an exemplary embodiment of the present invention is disposed in an instrument panel 1 equipped with the dash board, the audio system, and air-conditioning unit etc.

The knee airbag apparatus 100 is positioned at the lower portion in the instrument panel, lower than the passenger's knee, such that an airbag cushion 10 protects a passenger's knee by inflating upward from the lower portion of the instrument panel 1 in a car accident.

The knee airbag apparatus 100 includes: an airbag housing 20 disposed at the lower portion in the instrument panel 1; an inflator 30 disposed in the airbag housing 20 and generating a gas in a car accident; the airbag cushion 10 disposed in the airbag housing 20 and inflated and developed upward outside the instrument panel 1 by inflow gas from the inflator 30; and a cushion pocket 40 accommodated in the airbag cushion 10 and disposed in the airbag housing 20.

The inflator 30 is combined with the airbag housing 20 by a fastening member 35 in the airbag cushion 10 to generate and supply the gas into the airbag cushion 10 in a car accident.

A cushion inlet/outlet hole 45 is formed at the front end of the cushion pocket 40 to insert/take out the airbag cushion 10. The airbag cushion 10 is accommodated in the cushion pocket 40 by inserting the airbag cushion 10 folded several times into the cushion pocket 40 through the cushion inlet/outlet hole 45 and sewing the front end of the cushion pocket 40 to close the cushion inlet/outlet hole 45 such that the airbag cushion 10 is prevented from coming out through the cushion inlet/outlet hole 45. Therefore, it is possible to remove an airbag door (not shown) of the related art which closes the airbag housing 20 to prevent the airbag cushion 10 from coming out of the airbag housing 20 after the airbag cushion 10 is accommodated in the airbag housing 20.

Further, as the airbag cushion 10 in the cushion pocket 40 is inflated by inflow gas from the inflator 30 in a car accident, the thread sewn at the front end of the cushion pocket 40 is torn by inflation pressure of the airbag cushion 10 and the cushion inlet/outlet hole 45 is opened, such that the airbag cushion 10 develops outside the instrument panel 1 through the cushion inlet/outlet hole 45.

The cushion pocket 40 supports the airbag cushion 10 such that the airbag cushion 10 can inflate upward without sagging downward to be positioned between the instrument panel 1 and the passenger's knee.

That is, since the airbag cushion 10 is positioned at the lower portion in the instrument panel 1, lower than the passenger's knee, the airbag cushion 10 should inflate upward from the lower portion of the instrument panel 1 to be positioned between the instrument panel 1 and the passenger's knee in order to protect the passenger's knee. For this configuration, the cushion pocket 40 supports the airbag cushion 10 such that the airbag cushion 10 can develop upward without sagging downward, and thus, the airbag cushion 10 can develop between the instrument panel 1 and the passenger's knee.

Hooks 22a are formed at the front end of the airbag housing 20 and hook holes 40a where the hooks 22a are locked are formed at the front end, which corresponds to the front end of the airbag housing 20, of the cushion pocket 40. The cushion pocket 40 pivots upward with respect to the hooks 22a, when the airbag cushion 10 develops, and accordingly, the airbag cushion 10 develop upward outside the instrument 1 to be positioned between the instrument panel 1 and the passenger's knee.

The airbag housing 20 includes an upper housing 22 disposed above the cushion pocket 40 and a lower housing 24 disposed under the cushion pocket 40 and combined with the upper housing 22.

Since the hooks 22a are formed at the front end of the upper housing 22 and the hook holes 40a are formed at the upper end of the cushion pocket 40, the cushion pocket 40 pivots upward with respect to the hooks 22a while supporting the airbag cushion 10, such that the airbag cushion 10 can develop upward without sagging downward.

The airbag cushion 10 has a fold portion 15a folded such that the upper portion is shorter than the lower portion. Therefore, when the gas flows into the airbag cushion 10 from the inflator 30, tension is larger at the shorter upper portion than the lower portion, such that the airbag cushion 10 bends and develops upward from the fold portion 15 and accordingly it can be positioned between the instrument panel 1 and the passenger's knee.

The fold portion 15 is disposed in the cushion pocket 40. Therefore, as the airbag cushion 10 bends upward from the fold portion 15, the cushion pocket 40 is pivoted upward with respect to the hooks 22a by the force applied by the airbag cushion 10 bending upward, such that the airbag cushion 10 can inflate upward outside the instrument panel 1.

It is preferable that the cushion pocket 40 is made of a flexible material that can be bent by development pressure of the airbag cushion 10. The cushion pocket 40 is made by coating a fabric with silicon to withstand the temperature of the gas generated from the inflator 30 in the exemplary embodiment. As described above, when the cushion pocket 40 is made of a flexible material, the cushion pocket 40 is bent by the force applied by the airbag cushion 10 bending upward, when the airbag cushion 10 bends and inflates upward from the fold portion 15; therefore, the airbag cushion 10 develops upward.

An A plurality of upper tethers 50 are sewn to the upper inner side of the airbag cushion 10 and a plurality of lower tethers 60 are sewn to the lower inner side of the airbag cushion 10.

The upper tethers 50 and the lower tethers 60 are spaced apart from each other, respectively, a gas channel through which the gas flows is defined between the upper tethers 50 and the lower tethers 60.

The gas flows into the airbag cushion 10 from the inflator 30 hits the upper and lower tethers 50, 60 while passing through the gas channel, in which the force developing the airbag cushion 10 is increased by the force of the gas hitting the upper tethers 50 and the lower tethers 60.

A plurality of the upper tethers 50 and the lower tethers 60 are provided in the exemplary embodiment.

That is, the upper tethers 50 include a first upper tether 52, a second upper tether 54, and a third upper tether 56, which are disposed apart from each other at the portion of the airbag cushion 10 which develops outside the instrument panel 1, and a fourth upper tether 58 disposed at the portion of the airbag cushion 10 which does not develop outside the instrument panel, remaining in the airbag housing 20.

Further, the lower tethers 60 include a first lower tether 62 spaced apart from the first upper tether 52 to define the gas channel therebetween, a second lower tether 64 spaced apart from the second upper tether 54 to define the gas channel therebetween, a third lower tether 66 spaced apart from the third upper tether 56 to define the gas channel therebetween, and a fourth lower tether 68 spaced apart from the fourth upper tether 58 to define the gas channel therebetween.

The first upper tether 52, second upper tether 54, and third upper tether 56 are formed in one fold, respectively, whereas the fourth tether 58 is formed in two folds. Further, the first lower tether 62, second lower tether 64, and third lower tether 66 are formed in one fold, respectively, whereas the fourth lower tether 68 is formed in two folds.

The fold portion 15 is formed by folding the airbag cushion 10 and sewing this folded portion with the fourth upper tether 58.

Although it is exemplified that four upper tethers 50 are disposed and the fold portion 15 is formed by sewing the airbag cushion 10 to the fourth upper tether 58 in the exemplary embodiment, regardless of the number of upper tethers 50, the fold portion 15 may be formed by sewing the airbag cushion 10 to the upper tether (the fourth tether 58 in this configuration) which is disposed at the portion of the airbag cushion 10 which does not develop outside the instrument panel and remains in the airbag housing 20. That is, since the fold portion 15 is formed at the upper tether (the fourth tether 58 in this configuration) which remains in the airbag housing 20, as the airbag cushion 10 pivots upward about the fold portion 15, the cushion pocket 40 pivots upward about the hooks 22a at the upper end of the airbag housing 20, such that the airbag cushion 10 can develop upward outside the instrument panel 1.

On the other hand, the airbag cushion 10 may be damaged by temperature of the gas, because the gas generated from the inflator 30 flows at high temperature and pressure into the airbag cushion 10. Therefore, a shield 70 that can withstand the temperature of the gas is disposed from the fourth upper tether 58 to the fourth lower tether 68 via the inflator 30 in the airbag cushion 10 in order to prevent the airbag cushion 10 from being damaged by the temperature of the gas.

Figure 4:
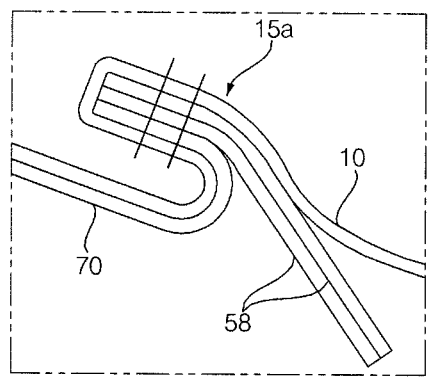
FIG. 4 is a view illustrating a process of forming the fold portion shown in FIG. 3.
Figure 4:
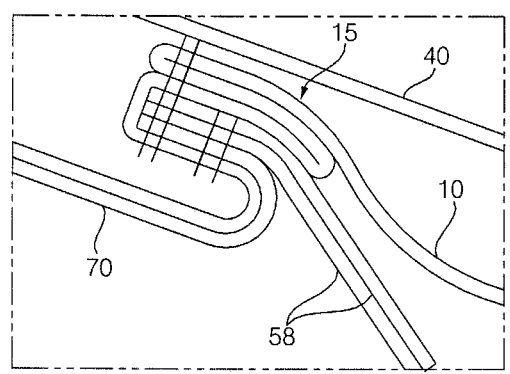

FIG. 4 is a view illustrating a process of forming the fold portion 15 shown in FIG. 3. A process of forming the fold portion 15 is described hereafter with reference to FIG. 4.

First, referring to FIG. 4(a), a first fold portion 15a is formed by contacting the shield 70 to one side of the fourth upper tether 58, contacting the airbag cushion 10 to the opposite side of the fourth upper tether 58, and sewing the airbag cushion 10 to the fourth upper tether 58.

Thereafter, as shown in FIG. 4(b), the fold portion 15 is completed by folding the portion where the shield 70 is not disposed in the airbag cushion 10 and sewing this portion to the first fold portion 15a.

The operation of the knee airbag apparatus 100 having the above configuration is described as follows.

First, the gas is generated from the inflator 30 and flows into the airbag cushion 10 and the airbag cushion 10 starts inflating, when a car accident occurs. In this operation, the cushion pocket 40 supports the airbag cushion 10 such that the airbag cushion 10 can develop upward without sagging.

Further, since the airbag cushion 10 has the fold portion 15 folded and sewn such that the upper portion is shorter than the lower portion and larger tension is exerted in the upper portion than the lower portion, the airbag cushion 10 develops while bending upward from the fold portion 15.

As the airbag cushion 10 bends upward, upward-bending force is applied to the flexible cushion pocket 40 accommodating the airbag cushion 10 with the airbag cushion 10, and accordingly, the cushion pocket 40 pivots upward about the hooks 22a of the airbag housing 20.

Thereafter, the airbag cushion 10 develops upward outside the instrument panel 1 and is positioned between the instrument panel 1 and the passenger's knee.

Therefore, since the airbag cushion 10 is positioned between the instrument panel 1 and the passenger's knee in a car accident, it is possible to prevent the passenger's knee from directly hitting instrument panel 1 and the structures of the instrument panel 1.

As described above, in the knee airbag apparatus 100 according to an exemplary embodiment of the present invention, since the cushion pocket 40 accommodating the airbag cushion 10 is disposed to support the airbag cushion 10 such that the airbag cushion 10 can develop upward without sagging downward, the airbag cushion 10 develops to between the instrument panel 1 and the passenger's knee; therefore, the airbag cushion 10 can develop to the position where the passenger's knee can be protected.

Further, since the fold portion 15 is formed such that the upper portion is shorter than the lower portion of the airbag cushion, tension is larger in the upper portion than the lower portion when the airbag cushion 10 develops; therefore, the airbag cushion 10 bends and develops upward from the fold portion 15 to be positioned between the instrument panel 1 and the passenger's knee. As a result, the airbag cushion 10 can develop to the position where the passenger's knee can be protected.

While certain embodiments have been described above, it will be understood to those skilled in the art that the exemplary embodiments described are by way of example only. Accordingly, the apparatus described herein should not be limited based on the described embodiments. The scope of the present invention is defined in the following claims and all changed or modified types derived from the meanings and scope of the claims and the equivalent concept thereof should be construed as being included in the scope of the present invention.

What is claimed is:

1. A knee airbag apparatus comprising:
an instrument panel;
an airbag housing disposed at a lower portion of the instrument panel; and
a cushion pocket disposed in the airbag housing, accommodating an airbag cushion, and supporting the airbag cushion such that the airbag cushion deploys upward outside the instrument panel without sagging to be positioned between the instrument panel and a passenger's knee,
wherein a hook is formed at a front end of the airbag housing and a hook hole associated with the hook is formed at a front end of the cushion pocket which corresponds to the front end of the airbag housing such that the cushion pocket pivots upward, when the airbag cushion deploys.

2. The knee airbag apparatus according to claim 1, wherein the airbag housing includes an upper airbag housing disposed above the cushion pocket and having the hook and a lower airbag housing disposed under the cushion pocket and combined with the upper airbag housing.

3. The knee airbag apparatus according to claim 1, wherein the cushion pocket is made of a flexible material.

4. The knee airbag apparatus according to claim 1, wherein a cushion inlet/outlet hole through which the airbag cushion is inserted/taken out is further formed at the front end of the cushion pocket, and the cushion inlet/outlet hole is closed by sewing the front end of the cushion pocket after the airbag cushion is accommodated in the cushion pocket through the cushion inlet/outlet hole.

5. A knee airbag apparatus comprising:

an instrument panel;

an airbag housing; and an airbag cushion disposed in the airbag housing, having a fold portion folded such that an upper portion of the airbag cushion is shorter than a lower portion of the airbag cushion, and bending upward from the fold portion and deploying upward outside the instrument panel to be positioned between the instrument panel and a passenger's knee, when a gas flows therein, wherein a plurality of upper tethers are disposed at the upper portion of the airbag cushion and a plurality of lower tethers are disposed apart from the upper tethers at the lower portion of the airbag cushion to define a gas channel through which the gas passes between the upper tethers and the lower tethers.

6. The knee airbag apparatus according to claim 5, wherein the plurality of upper tethers include:

a first upper tether, a second upper tether, and a third upper tether, which are disposed apart from each other at a portion of the airbag cushion which deploys outside the instrument panel; and a fourth upper tether disposed at a portion of the airbag cushion which does not deploy outside the instrument panel and remains in the airbag housing.

7. The knee airbag apparatus according to claim 6, wherein the fold portion is formed by folding the airbag cushion and sewing the folded portion to the fourth upper tether.

8. The knee airbag apparatus according to claim 6, wherein the plurality of lower tethers include:

a first lower tether spaced apart from the first upper tether to define the gas channel therebetween;

a second lower tether spaced apart from the second upper tether to define the gas channel therebetween;

a third lower tether spaced apart from the third upper tether to define the gas channel therebetween; and a fourth lower tether spaced apart from the fourth upper tether to define the gas channel therebetween.

9. The knee airbag apparatus according to claim 8, further comprising an inflator disposed in the airbag cushion, combined with the airbag housing, and supplying the gas into the airbag cushion, wherein a shield that withstands temperature of the gas is further disposed from the fourth upper tether to the fourth lower tether via the inflator in the airbag cushion.

10. The knee airbag apparatus according to claim 9, wherein the fold portion is formed by forming a first fold portion by contacting the shield to one side of the fourth upper tether, contacting the airbag cushion to the opposite side of the fourth upper tether, and sewing the airbag cushion to the fourth upper tether, and then folding the portion where the shield is not disposed in the airbag cushion and sewing the portion to the first fold portion.

11. A knee airbag apparatus comprising:

an instrument panel;

an airbag housing;

an airbag cushion disposed in the airbag housing, having a fold portion folded such that an upper portion of the airbag cushion is shorter than a lower portion of the airbag cushion, and bending upward from the fold portion and deploying upward outside the instrument panel to be positioned between the instrument panel and a passenger's knee, when a gas flows therein; and a cushion pocket disposed in the airbag housing, accommodating the airbag cushion, and supporting the airbag cushion such that the airbag cushion deploys upward outside the instrument panel without sagging to be positioned between the instrument panel and the passenger's knee, wherein a hook is formed at a front end of the airbag housing and a hook hole associated with the hook is formed at a front end of the cushion pocket which corresponds to the front end of the airbag housing such that the cushion pocket pivots, upward, when the airbag cushion deploys.

12. The knee airbag apparatus according to claim 11, wherein the fold portion is disposed in the cushion pocket such that the cushion pocket pivots upward from the hook, when the airbag cushion pivots upward from the fold portion.

13. The knee airbag apparatus according to claim 11, wherein the airbag housing includes an upper housing disposed above the cushion pocket and having the hook and a lower housing disposed under the cushion pocket and combined with the upper housing.

14. The knee airbag apparatus according to claim 11, wherein the cushion pocket is made of a flexible material.

15. The knee airbag apparatus according to claim 11, wherein a cushion inlet/outlet hole through which the airbag cushion is inserted/taken out is further formed at the front end of the cushion pocket, and the cushion inlet/outlet hole is closed by sewing the front end of the cushion pocket after the airbag cushion is accommodated in the cushion pocket through the cushion inlet/outlet hole.

16. A knee airbag apparatus comprising:

an instrument panel;

an airbag housing;

an airbag cushion disposed in the airbag housing, having a fold portion folded such that an upper portion of the airbag cushion is shorter than a lower portion of the airbag cushion, and bending upward from the fold portion and deploying upward outside the instrument panel to be positioned between the instrument panel and a passenger's knee, when a gas flows therein;

a cushion pocket disposed in the airbag housing, accommodating the airbag cushion, and supporting the airbag cushion such that the airbag cushion deploys upward outside the instrument panel without sagging to be positioned between the instrument panel and the passenger's knee;

a plurality of upper tethers disposed at the upper portion in the airbag cushion; and a plurality of lower tethers disposed apart from the upper tethers at the lower portion in the airbag cushion to define a gas channel through which the gas passes between the upper tethers and the lower tethers.

17. The knee airbag apparatus according to claim 16, wherein the plurality of upper tethers include:
- a first upper tether, a second upper tether, and a third upper tether, which are disposed apart from each other at a portion of the airbag cushion which deploys outside the instrument panel; and
- a fourth upper tether disposed at a portion of the airbag cushion which does not deploy outside the instrument panel and remains in the airbag housing.

18. The knee airbag apparatus according to claim 17, wherein the fold portion is formed by folding the airbag cushion and sewing the folded portion to the fourth upper tether.

19. The knee airbag apparatus according to claim 17, wherein the plurality of lower tethers include:
- a first lower tether spaced apart from the first upper tether to define the gas channel therebetween;
- a second lower tether spaced apart from the second upper tether to define the gas channel therebetween;
- a third lower tether spaced apart from the third upper tether to define the gas channel therebetween; and
- a fourth lower tether spaced apart from the fourth upper tether to define the gas channel therebetween.

20. The knee airbag apparatus according to claim 19, further comprising an inflator disposed in the airbag cushion, combined with the airbag housing, and supplying the gas into the airbag cushion,
wherein a shield that withstands temperature of the gas is further disposed from the fourth upper tether to the fourth lower tether via the inflator in the airbag cushion.

21. The knee airbag apparatus according to claim 20, wherein the fold portion is formed by forming a first fold portion by contacting the shield to one side of the fourth upper tether, contacting the airbag cushion to the opposite side of the fourth upper tether, and sewing the airbag cushion to the fourth upper tether, and then folding the portion where the shield is not disposed in the airbag cushion and sewing the portion to the first fold portion.

* * * * *